United States Patent [19]

Leonard

[11] 4,147,566

[45] Apr. 3, 1979

[54] CROSS BLEND OR SOLVENT TYPE RUST CONVERTING PAINT

[76] Inventor: Clarence E. Leonard, 20405 Martin Rd., St. Clair Shores, Mich. 48081

[21] Appl. No.: 837,945

[22] Filed: Sep. 29, 1977

[51] Int. Cl.$^2$ ................................................ C23F 7/10
[52] U.S. Cl. ...................... 148/6.15 R; 260/29.6 MP; 260/29.6 RW
[58] Field of Search ...................... 148/6.15 R, 6.15 Z, 148/6.16; 427/388 C; 260/29.6 E, 29.6 MH, 29.6 MP, 29.6 RW

[56] References Cited

U.S. PATENT DOCUMENTS

| | | | |
|---|---|---|---|
| 3,097,118 | 7/1963 | Leonard | 148/6.15 Z |
| 3,210,219 | 10/1965 | Jenkins | 148/6.15 R |
| 3,853,606 | 12/1974 | Parkinson | 427/388 C |

*Primary Examiner*—Ralph S. Kendall
*Attorney, Agent, or Firm*—Dolgorukov & Dolgorukov

[57] ABSTRACT

The specification discloses a rust converting paint which may either be of an all solvent type, or a cross blend between a solvent based and a water based paint, in either case having an acid pH and consisting essentially of, a solvent based resin, alcohols and phosphoric acid in an amount sufficient to act as a rust remover, converter and inhibitor. The maximum amount of acid varies with the other components of the paint. The cross-blend paint will also contain water and hydrocarbons. Coloring matter and opacity elements are optional in either version.

11 Claims, No Drawings

CROSS BLEND OR SOLVENT TYPE RUST CONVERTING PAINT

My invention relates to a new and useful product for removing rust from a metal object by converting it to mineral salts and simultaneously providing a rust preventing film on such metal object, and more specifically deals with improvements to the subject matter of my previously issued U.S. Pat. No. 3,097,118, the specification of which is incorporated herein by reference.

There is disclosed in my earlier patent a water based rust converting paint consisting essentially of a water based resin, phosphoric acid, water, and other ingredients as desired. The water based rust converting paint employed hydrolysis to convert the rust on the base metal being treated to mineral salts which are tightly bonded to the metal and simultaneously applied a rust protective coating to the metal being treated.

While my earlier patent represented a breakthrough in the corrosion prevention field in its day, and is still used in many applications, as production requirements increased, and the desirability of a product pleasing to the eye became more apparent, it was evident to me that some additional improvement in my earlier invention was needed to maintain a product competitive in all fields. The lack of present day competitiveness of my earlier product is due mainly to the fact that being a water based coating, it was of rather low gloss as contrasted to the high gloss finishes of solvent based paints and also in some applications, particularly for outside weather exposure, the initial curing rate of the paint covered by my earlier patent was in some instances not rapid enough to prevent unexpected rain penetration into the fresh paint film in the earlier stages of the curing cycle, thus ruining the paint application and causing undue expense in having to repaint the articles previously coated.

Also, coupled with this problem, even when the problem of outside exposure is not present, is the fact that the paint of my previous invention could take several days to cure through in some instances, and this is too slow for present day production rates, especially for prime coats, which the earlier patent was limited to in some degree because of the aforementioned problem of low gloss. Thus, it is one of the objects of the present invention to produce a rust converting coating which is of a high gloss nature.

A further object of the present invention is to provide a rust converting paint with a relatively high rate of through cure as compared to a water based rust converting paint, and thus produce a paint which can be applied at high production rates.

A further object of the present invention is to provide a high gloss rust converting paint which is a cross blend of water based and solvent based paints.

A still further object of the present invention is to provide a rust converting paint of the aforementioned nature which is particularly suitable for outside weather exposure, and has excellent durability.

A still further object of the present invention is to provide a rust converting paint which simultaneously converts any rust on a metal surface to a mineral salt and deposits a rust preventing film on said metal surface.

A still further object of the present invention is to provide a rust converting paint which is particularly applicable to fog coating applications.

Further objects and advantages of this invention will be apparent from the following description and appended claims. It is to be understand that the phraseology and terminology that will be employed herein is for the purpose of description, and not of limitation.

In my search for a means of improving the curing rate and gloss of my water based rust converting paint, I first thought of introducing a water insoluble fixed vehicle therein which, of course, is the type of vehicle which contributes to the gloss in oil base paints. I first made a solution of water insoluble acrylic resin and drying oil in toluol and blended it with a water based paint without pigment so I could observe compatability and clarity. These types of mixtures consistently gave turbidity problems which had to be eliminated to produce a practical and commercially feasible solution to the problem. Much time was spent studying this problem until it was confirmed that the drying oil in my previous experimental solutions was partially responsible for the turbidity problems. Using the acrylic resin in toluol without the drying oil gave me a cross blend between the water based and solvent based paints if the toluol was added in small additions, but if I attempted to use the percentages needed for a practical product, the toluol proceeded to break the emulsion in the water base and ruin the product.

Considerable further experimentation followed until I made my first cross blend using a straight alcohol solution of acrylic resin which worked very nicely up until a point of concentration whereupon turbidity again began to develop. This indicated that a limited amount of hydrocarbon solvent was needed, and consequently toluol or a substitute, xylol, was added to the solution in amounts far below that which would cause any disturbance of the emulsion, which solved the problem completely, yielded excellent clarity and improved both the initial curing rate and the final gloss of my earlier paints.

From the above, it can be seen that the chemical behavior of water and certain alcohols is quite similar, and some results achieved by hydrolysis can be achieved by alcoholysis, and therein lies the key to the subject improvements. I employ alcoholysis either alone, or in combination with hydrolysis, without loss of effective rust conversion or phosphatization. The cross blends utilize both hydrolysis and alcoholysis, and as the solvent type paint content increases the alcohol content increases correspondingly, reaching the alcohol maximum when the final product is all organic solvent type, with no water based resins added. It is to be understood that the term "organic solvent type paints" includes conventional oil based paints, enamels, japans, varnishes, resins and/or oil solutions, dissolved or otherwise dispersed in organic solvents compatible with the types of alcohols used in these formulations, and used as protective coatings on metals, particularly on ferrous metals.

The following nine examples show how one can start out with the cross blend, and continuously increase the percentage of solvent type paints until a completely organic solvent type paint is present.

EXAMPLE 1

Cross blend of solvent type acrylic and aqueous acrylic resins.

| | |
|---|---|
| Acrylic-water base, 55% solids | 50.2% |

| | |
|---|---|
| Acrylic-solvent base, 100% solids | 0.2 |
| Isopropyl alcohol | 5.0 |
| Tricresyl phosphate | 0.9 |
| Pine oil | 0.3 |
| Antifoaming agent | 0.5 |
| Dispersant | 0.3 |
| Methocel, 3% in water | 2.9 |
| Iron oxide red | 15.1 |
| Chrome green | 10.4 |
| Phosphoric acid 85% | 9.5 |
| Water | 4.7 |
| | 100.0 |

EXAMPLE 2,

A cross blend of solvent type alkyd, aqueous acrylic, and solvent acrylic.

| | |
|---|---|
| Commercial alkyd solution, 50% solids in hydrocarbon solvent | 24.0% |
| Acrylic-water base, 55% solids | 14.1 |
| Solvent type acrylic, 100% solids | 3.9% |
| Isopropyl Alcohol | 19.8 |
| Butyl Alcohol | 20.2 |
| Water | 6.2 |
| Phosphoric Acid, 75% strength | 11.8 |
| | 100.0 |

EXAMPLE 3

A cross blend of solvent type alkyd, aqueous acrylic, and solvent acrylic.

| | |
|---|---|
| Commercial alkyd solution, 50% solids in hydrocarbon solvent | 17.3% |
| Titanium Dioxide | 19.6 |
| Acrylic-water base, 55% solids | 11.3 |
| Solvent type acrylic, 100% solids | 5.1 |
| Isopropyl alcohol | 15.9 |
| Butyl alcohol | 16.3 |
| Water | 5.0 |
| Phosphoric acid, 75% strength | 9.5 |
| | 100.0 |

EXAMPLE 4

A cross blend of aqueous acrylic and solvent acrylic.

| | |
|---|---|
| Acrylic-water base, 55% solids | 19.7% |
| Solvent type acrylic, 100% solids | 4.7 |
| Water | 18.1 |
| Isopropyl alcohol | 15.8 |
| Butyl alcohol | 8.9 |
| Phosphoric acid, 75% strength | 7.5 |
| Titanium dioxide | 12.4 |
| Carbon black | 2.1 |
| Mica | 6.2 |
| Methyl cellulose, 3% in water | 4.6 |
| | 100.0 |

EXAMPLE 5

Solvent type, phenol formaldehyde base.

| | |
|---|---|
| Phenol formaldehyde, alcohol soluble | 16.4% |
| Titanium dioxide | 7.1 |
| Chromium green | 18.3 |
| Butyl alcohol | 49.8 |
| Phosphoric acid, 75% strength | 8.4 |
| | 100.0 |

EXAMPLE 6

A solvent type alkyd.

| | |
|---|---|
| Commercial alkyd solution, 50% solids in hydrocarbon solvent | 48.6% |
| Isopropyl alcohol | 24.4 |
| Butyl alcohol | 11.5 |
| Phosphoric acid, 75% strength | 6.4 |
| Iron blue | 5.3% |
| Talc | 1.1 |
| Barytes | 2.7 |
| | 100.0 |

EXAMPLE 7

A solvent type epoxy.

| | |
|---|---|
| Commercial epoxy solution, 25% solids, organic solvent | 48.0% |
| Commercial activator, 15% solids | 6.0 |
| Isopropyl alcohol | 3.8 |
| Xylol | 2.5 |
| Butyl alcohol | 20.3 |
| Phosphoric acid, 75% strength | 6.3 |
| Ferrite yellow | 4.1 |
| Benzidine yellow | 4.6 |
| Asbestine | 4.4 |
| | 100.0 |

EXAMPLE 8

A solvent type vinyl.

| | |
|---|---|
| Solvent type vinyl resin, 100% solids | 30.1% |
| Isopropyl alcohol | 28.5 |
| Phosphoric acid, 75% strength | 8.0 |
| Butyl alcohol | 16.4 |
| Toluidine red | 5.1 |
| Red oxide or iron | 3.0 |
| Mica | 7.8 |
| Tricresyl phosphate | .8 |
| Pine oil | .3 |
| | 100.0 |

EXAMPLE 9

Processed natural gum, cross blend.

| | |
|---|---|
| Commercial spar varnish, 50% solids comprised of ester gum, linseed oil and phenolic resin, in hydrocarbon solvent | 14.97% |
| Vinyl-water base, 50% solids | 68.11 |
| Solvent type acrylic, 100% solids | 1.50 |
| Toluol | 3.49 |
| Isopropyl alcohol | 4.60 |
| Phosphoric acid, 75% strength | 7.33 |
| | 100.00 |

As can be seen from the above examples, the solvent type rust converting paint consists of at a minimum three components, a solvent based resin, an alcohol and a phosphoric acid. Also, from the examples it can be seen that the quantity of solvent based resins, in percent by weight, can vary widely. My experiments to date indicate that it can be from as little as one percent by weight to ninety-nine percent by weight, on a solids basis, depending on the other components present, and whether optional additives such as curing agents or drying agents are present or, if the paint is intended to be baked on the metal surface, whether anti-foaming, anti-settling or viscosity agents, such as methyl cellulose are present. As a preferred range, I prefer to use from approximately 0.2% to 50% by weight of a solvent based resin; but it should be understood that anywhere in the broader range quoted will make an acceptable rust converting paint, and any percentage mentioned above is well within the scope of the claims of the present invention.

The second component which is absolutely necessary to have a solvent type rust converting paint is one or more types of alcohol, and it should be understood that again depending upon the other components present a monohydric, a dihydric, or trihydric alcohol may be used. The alcohol content in percent by weight can, as a practical matter, vary almost as much as the solvent based resin content, and in my experiments I have received indications that any amount from approximately one half percent by weight to eighty-five percent by weight will produce a satisfactory coating. One particular application which uses a very high percentage of alcohol is a composition used for what is called "fog coating" which can consist of as little as 6.1% by weight of an alcohol soluble acrylic resin, 12.9% by weight of a commercial phosphoric acid of 75% strength, and 81% by weight of alcohol.

A preferred range of alcohol is from about 4% by weight to about 50% by weight, with the higher ranges being needed when the rust converting paint is to be used with bodying agents or dryers. In most cases one does not go below 4% by weight unless there is a special application, because with the low percent by weight of alcohol you may not get the curing speed you need for mass production.

The phosphoric acid is used in somewhat narrower ranges than the resins and alcohols, and the widest range which my experiments have indicated as being practicable is from about ½% by weight to about 50% by weight. The higher percentages of phosphoric acid are needed when it is anticipated that you will have a casting with very heavy rust, and in this case it would be feasible to use a 50% phosphoric acid solution with lesser amounts of other components. However, the high percentages of acid lead to a paint which is somewhat difficult to handle in use, and can be harmful upon contact with the skin. Also, it cannot be brushed, as damage to ordinary paint brushes can occur with an acid content above 15%. An acid content above 50% is usually impractical due to difficulty in handling and environmental factors. A preferred range for the phosphoric acid is about 5% by weight to about 15% by weight, this being a paint composition which will not harm the skin or damage the ordinary painting equipment.

It can be seen, however, that any paint which falls in the broad range listed for these three components is well within the scope of the present invention.

Since it is the use of alcohols which are soluble in water and agreeable with solvent type paints which allows the large percentages of phosphoric acid to be present in my novel composition, it would be logical to assume, and indeed it is the case that the percentage of acid is a function of the percentage of the organic hydrocarbon solvent present in relation to water and alcohol. As the alcohol increases, one can add more solvent and acid before cloudiness or incompatibility sets in.

The amount of acid and alcohol also depends upon the viscosity of the paint. If one were to thin the paint and thus lower the viscosity when one desires to use the "fog" coat, one could lower the viscosity and vary the amount of acid, alcohol and water. If one desired to go in the reverse direction, one could increase the viscosity by adding bodying agents and then add more hydrocarbons and/or alcohol to the paint. Thus, the limits set forth above are the maximum limits known to me to work and the exact proportions of the elements can vary widely in accordance with the above relationship.

In applications where a cross blend of a solvent based resin paint and a water base resin paint is preferred, at least one additional element in addition to those listed above is added to my composition, and that takes the form of a water based resin which may be such as an acrylic resin, a vinyl resin, an alkyd resin, or an epoxy resin and the like. The amount of water based resin which is added varies with resin to resin as they have varying compatibilities with the components listed above. You must add more with some resins to get the desired viscosity than with others, and also in "clears" and the like you would have a higher percentage of resin, and a lower percentage of resins where coloring matter and opacity elements are in the composition, which will be discussed later. A broad range which has been shown to work can be from about 0.2% by weight when you have almost a pure water-based paint, such as covered in my previous patent, to 99% resin, on a solids basis, but these broad ranges are usually for very specialized applications and a preferred range which will meet most requirements is from about 0.2% to about 25% resin solids by weight, on a solids basis.

Depending upon the other four components of the composition, it may prove to be desirable to add water and hydrocarbons as thinners in my paint composition. I have found occasions to add water to my compositions in an amount of about 4% by weight to about 50% by weight, although it should be understood that water may be added in any practical amount and be within the scope of the claims. Likewise, occasions have been found to add hydrocarbons to the composition up to approximately 50% by weight.

To this point all the mixtures that have been discussed have been what are known in the art as "clears" which are paint compositions without additional coloring matter or opacity elements which add fillers or coloring matters to the paint to make it pleasing to the eye or more functional. These coloring matters and opacity elements can take many forms, such as being of the group usually called "dye stuffs", which include insoluble materials, such as organic pigments, or soluble dyes known in the art as "color lakes". Examples of inorganic pigments which may be used are titanox, carbon black, ferrite yellow, iron blue, oxides of iron, chrome green, and the like, and inerts such as barytes, mica, asbestine, etc. Many other examples could be quoted but these are the commonly used ones, and also are the ones used in the previous examples.

Thus, by using a combination of hydrolysis and alcoholysis in providing a rust converting paint of a solvent type or a cross blend between a water based and a solvent based paint, I have provided an improved coating that in a single one-step operation can paint a surface while simultaneously dissolving any rust present and converting it into mineral salts which tightly attach themselves to the metal surface under the paint film and serve as a highly effective inhibitor against subsequent rusting. The metal is also etched, thus improving paint adhesion, and rust on unprotected areas adjacent to the coating will not spread under the paint film. The resulting coating provides unusually long protection for the coated metal, is tough, flexible, glossy, and tightly adhering. In addition, these improvements are achieved at considerable savings in the labor usually required prior to conventional painting processes, such as wire brushing, sandpapering, sandblasting, etc., to remove rust and to roughen the metal for better adhesion. Further, a rust converting paint of improved durability and glossiness is produced, and one which does much more than previous attempts at stopping rust were able to do. My composition actually converts the rust rather than merely forming a physical barrier to further rusting such as does zinc chromate, and does more than such compositions as Rustoleum, which only have a very low surface tension and surround rust, but do not convert it.

It should also be understood that although the coatings discussed herein were developed primarily for ferrous metals, they are not limited to converting rust on such metals, but also can be used for converting products of corrosion on other metals, such as brass, copper, bronze, zinc, aluminum, etc., and will convert the corrosion present on any of these types of metals to mineral salts which bond tightly to the metal while providing a coating resistent to further corrosion. The converting of corrosion on aluminum is of particular interest at present since aluminum auto bodies are scheduled to make their debut in the near future. Orthodox paints frequently do not adhere well to aluminum unless it is pretreated to roughen the surface. The subject paint will etch the surface of aluminum in the painting operation providing excellent adhesion without any pretreatment.

I claim:

1. A cross blend rust converting paint consisting essentially of, in percent by weight:
   (a) organic solvent soluble resins, about 1% to about 99%, on a solids basis,
   (b) primary water soluble alcohols, about ½% to about 85%,
   (c) phosphoric acid, about ½% to about 50%,
   (d) water based resins, about 0.2% to about 99%, on a solids basis.

2. The composition defined in claim 1, and including water in percent by weight of about 4% to 50%.

3. The composition defined in claim 2, and including hydrocarbons, in percent by weight, from about 4% to about 50%.

4. The composition defined in claim 3, and including coloring matter and opacity elements, in percent by weight, from about 1% to about 25%.

5. A cross blend rust converting paint consisting essentially of, in percent by weight:
   (a) organic solvent soluble resins, about 0.2% to about 50%,
   (b) primary water soluble alcohols, about 4% to about 50%,
   (c) phosphoric acid, about 0.5% to about 50%,
   (d) water based resins, about 0.2% to about 25%.

6. The composition defined in claim 5, and including water, in percent by weight, from about 4% to about 50%.

7. The composition defined in claim 6, and including hydrocarbons, in percent by weight, of about 4% to about 50%.

8. The composition defined in claim 7, and including coloring matter and opacity elements in percent by weight from about 1% to about 25%.

9. A rust converting paint consisting essentially of, in percent by weight:
   (a) commercial alkyd solution of 50% solids and hydrocarbon solvent with vegetable oils present, about 24%,
   (b) acrylic water base, 55% solids, about 14.1%,
   (c) A solvent type acrylic resin, 100% solids, about 3.9%,
   (d) Isopropyl alcohol, about 19.8%,
   (e) Butyl alcohol, about 20.2%,
   (f) water, about 6.2%, and
   (g) phosphoric acid, 75% strength, about 11.8%.

10. A cross blend rust converting paint consisting essentially of, in percent by weight,
    (a) commercial alkyd solution, 50% solids in hydrocarbon solvent, about 17.3%,
    (b) titanium dioxide, about 19.6%,
    (c) acrylic water base, 55% solids, about 11.3%,
    (d) solvent type acrylic resin, 100% solids, about 5.1%,
    (e) Isopropyl alcohol, about 15.9%,
    (f) Butyl alcohol, about 16.3%,
    (g) water, about 5.0%, and
    (h) phosphoric acid, 75% strength, about 9.5%.

11. A cross blend rust converting paint having a cross blend of aqueous acrylic and solvent acrylic compositions consisting essentially of, in percent by weight:
    (a) acrylic water base, 55% solids, about 19.7%,
    (b) organic solvent soluble type acrylic, 100% solids, about 4.7%,
    (c) water, about 18.1%,
    (d) Isopropyl alcohol, about 15.8%,
    (e) Butyl alcohol, about 8.9%,
    (f) Phosphoric acid, 75% strength, about 7.5%,
    (g) titanium dioxide, about 12.4%,
    (h) carbon black, about 2.1%,
    (i) mica, about 6.2% and
    (j) methyl cellulose, 3% in water, about 4.6%.

* * * * *